United States Patent

Rexford

[15] 3,654,943
[45] Apr. 11, 1972

[54] VORTEX FLUID AMPLIFIER CIRCUIT FOR CONTROLLING FLOW OF ELECTRICALLY CONDUCTIVE FLUID

[72] Inventor: Donald L. Rexford, Schenectady, N.Y.
[73] Assignee: General Electric Company
[22] Filed: Apr. 8, 1970
[21] Appl. No.: 26,503

[52] U.S. Cl.................................................137/9, 137/81.5
[51] Int. Cl..........................................................F15c 1/16
[58] Field of Search..................................137/81.5; 417/50

[56] References Cited

UNITED STATES PATENTS

| | | | |
|---|---|---|---|
| 3,046,893 | 7/1962 | Carlson, Jr. et al. | 417/50 |
| 3,066,607 | 12/1962 | Cole | 417/50 |
| 3,273,594 | 9/1966 | Mayer | 137/81.5 X |
| 3,410,291 | 11/1968 | Boothe et al. | 137/81.5 |
| 3,416,550 | 12/1968 | Griffin, Jr. | 137/81.5 |
| 3,417,770 | 12/1968 | Denison | 137/81.5 |
| 3,417,772 | 12/1968 | Schaeffer | 137/81.5 |
| 3,438,384 | 4/1969 | Hurvitz | 137/81.5 |
| 3,478,960 | 11/1969 | Taylor | 137/81.5 X |
| 3,486,975 | 12/1969 | Ripley | 137/81.5 X |
| 3,537,466 | 11/1970 | Chapin | 137/81.5 |

*Primary Examiner*—Samuel Scott
*Attorney*—David M. Schiller, Arthur E. Fournier, Jr., Frank L. Neuhauser, Oscar B. Waddell and Joseph B. Forman

[57] ABSTRACT

A small electromagnetic pump connected in the control fluid passage of a vortex type fluid amplifier controls the flow of a pressurized electrically conductive fluid through the vortex fluid amplifier. The use of a second vortex fluid amplifier supplied from the same source of electrically conductive fluid as the first vortex amplifier, and a second small electromagnetic pump connected in its control fluid passage provides a circuit for controlling the flow to load circuits connected to the outputs of the two vortex amplifiers. A push-pull control of the two pumps produces a desired proportioning of the flows to the load circuits.

5 Claims, 2 Drawing Figures

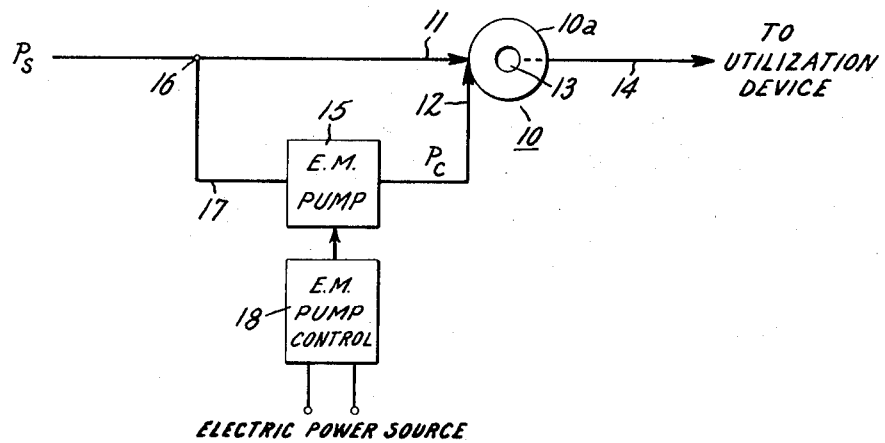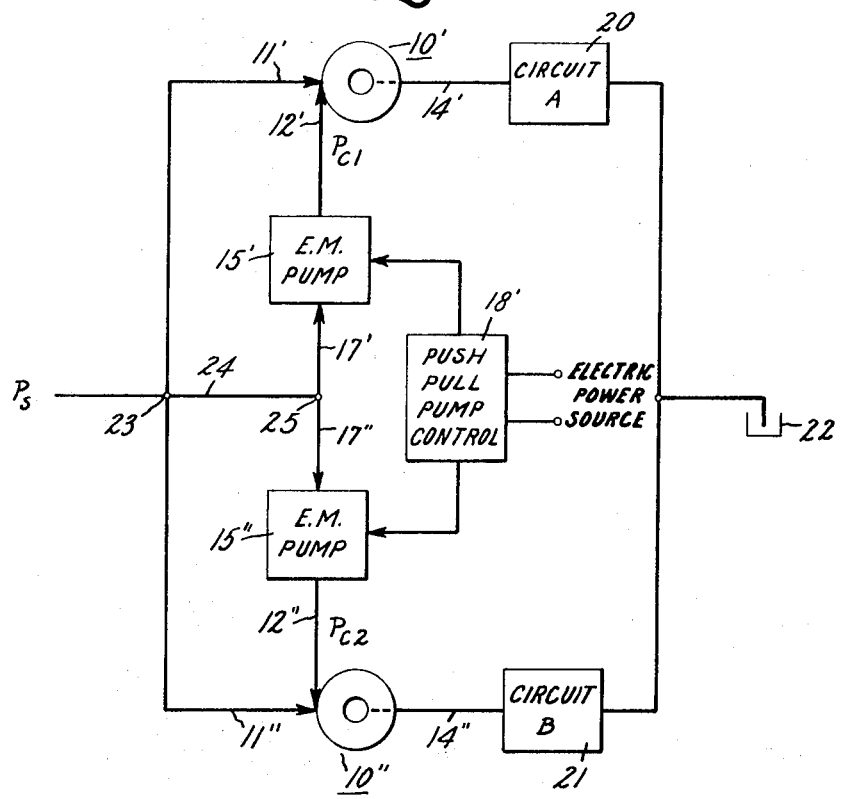

VORTEX FLUID AMPLIFIER CIRCUIT FOR CONTROLLING FLOW OF ELECTRICALLY CONDUCTIVE FLUID

My invention relates to a circuit for controlling the flow of an electrically conductive fluid, and in particular, to a circuit utilizing a vortex type fluid amplifier which is controlled by a relatively small electromagnetic pump for controlling the flow of the fluid through the amplifier.

There are certain applications wherein conventional means for controlling the flow of a fluid is not feasible due to a hostile environment. The particular hostile environment under consideration herein is a high ambient temperature (in the order of 1,500° F.) or wide operating temperature range and the fluid considered herein is an electrically conductive fluid. In one particular application of my invention in a nuclear reactor control system for controlling the flow of an electrically conductive coolant fluid such as one of the liquid metals (i.e. sodium potassium NaK), the hostile environment further includes a radioactive surrounding. Other applications of my invention are in high performance aircraft actuation control systems for controlling the landing gear, flaps, or the like, and space applications for the control of re-entry vehicles and space power plants wherein the high temperature application requires the use of an electrically conductive fluid.

It is known to employ E-M (electromagnetic) pumps for controlling the flow of electrically conductive fluid, and such device can be used in the above mentioned applications as the sole control element. However, E-M pump as a sole control element requires a relatively large size pump utilizing a relatively large amount of electrical power for operation thereof, and in many applications such large amount of electrical power is either not available or such approach is not economical. Thus, it would be highly desirable, and in many cases, necessary, to provide an improved means for controlling the flow of an electrically conductive fluid.

Therefore, one of the principal objects of my invention is to provide a vortex fluid amplifier circuit for controlling the flow of an electrically conductive fluid.

Another object of my invention is to employ a relatively small electromagnetic pump in the control fluid passage of the vortex fluid amplifier for developing the control action.

A further object of my invention is to provide a second vortex fluid amplifier and second small electromagnetic pump, and reciprocal control for controlling the two vortex fluid amplifiers in a push-pull mode to provide a diverting circuit for the electrically conductive fluid.

A still further object of my invention is to provide an improved method for controlling the flow of an electrically conductive fluid.

Briefly stated, my invention is a vortex fluid amplifier circuit provided with a relatively small electromagnetic pump in the control fluid passage of the vortex type fluid amplifier. Control of the excitation of the electromagnetic pump controls the main electrically conductive fluid flow through the vortex fluid amplifier. The connection of a second vortex fluid amplifier and electromagnetic pump in parallel circuit relationship with the first amplifier and pump results in a diverter circuit for obtaining a desired proportioning of the electrically conductive fluid flow at the outputs of the two fluid amplifiers.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character, and wherein:

FIG. 1 is a combined schematic-block diagram of a vortex fluid amplifier circuit for controlling the flow of electrically conductive fluid constructed in accordance with my invention; and FIG. 2 is a combined schematic-block diagram of a push-pull embodiment of my circuit illustrated in FIG. 1.

Referring now in particular to FIG. 1, there is illustrated in schematic form a conventional type vortex fluid amplifier 10 having no moving mechanical parts, an example of the specific structure of such fluidic device being disclosed in U.S. Pat. No. 3,324,891 to J. M. Rhoades and assigned to the assignee of the present invention. Briefly, a conventional vortex fluid amplifier consists of a cylindrical chamber 10a having a main fluid inlet passage 11 extending radially through a cylindrical side wall thereof and a control fluid inlet passage 12 extending tangentially through the side wall. The cylindrical chamber is conventionally enclosed by two parallel planar end members and an output port 13 is located in at least one of such end members, and centrally thereof, for discharging the fluid from the chamber.

The conventional vortex fluid amplifier operates in the following manner. A pressurized fluid is supplied to the main fluid passage 11 and such main fluid flow is directed radially inward toward output port 13. In the absence of any control exerted by control fluid passage 12, the main fluid passes directly to the output port and undergoes a small pressure drop which is a function of the amplifier geometry and pressure of the input main fluid. A pressurized fluid supplied to control passage 12 directs such control fluid tangentially inward of chamber 10 and provides therein an arcuate or vortical flow through the chamber which restrains the flow of fluid from main passage 11 to output port 13 in a directly proportional manner with the control fluid pressure. Thus, an increase in the pressure of the control fluid restrains the main fluid flow through the chamber to a greater degree and thereby develops a greater pressure drop from the fluid amplifier input 11 to the output 13 whereas a decrease in control fluid pressure develops a smaller pressure drop. The fluid in a passage 14 connected to output port 13 therefore may be at a pressure substantially equal to the pressure of the main fluid in passage 11 in the case of negligible control action (i.e. control fluid pressure is zero) and assumes decreasing pressure with increasing control fluid pressure, the main fluid pressure being held constant. It should be appreciated that the vortex fluid amplifier is generally incapable of producing a zero output flow since an increasing control pressure which restrains the main flow, results in a control fluid flow which must exit at output port 13. Suitable venting of the vortex amplifier may reduce the minimum output flow, however, such venting increases the complexity of the device and reduces its efficiency (output fluid flow/main input fluid flow) as in the case of the conventional beam deflection type fluid amplifier.

The fluid to be controlled by the vortex fluid amplifier circuit which constitutes my invention is of the electrically conductive type. Although the subject fluid may be a gaseous medium it is more often a liquid. Thus, in the application of my invention in a nuclear reactor control system, the fluid may be the liquid metal, NaK and is utilized as a circulating coolant fluid in the reactor. Output passage 14 may thus be connected directly or indirectly to a utilization or load device being supplied with the controlled fluid flow from vortex fluid amplifier 10. Both the main and control fluids are electrically conductive, and, in general, are identical fluids since they appear in their mixed state in output passage 14.

Control of the pressure $P_c$ of the control fluid flowing in passage 12 is achieved by connecting a relatively small electromagnetic (E-M) pump 15 in the control fluid passage circuit of the vortex fluid amplifier. The input to pump 15 is connected by means of a passage 17 to juncture 16, and the output is connected to the input end of control fluid passage 12. Juncture 16 is connected to a source $P_s$ of the pressurized electrically conductive fluid, and also is connected to the input end of main fluid passage 11. E-M pump 15 may be the conventional type having no moving mechanical parts wherein an electromagnet is energized from a source of electric power to produce a magnetic field and two high current conductor feeders are supplied from a source of electric power to cause a flow of high electric current through the electrically conductive fluid. The directions of the magnetic field and electric current are both perpendicular to the direction of fluid flow through the pump which is also the direction of the force generated in the pump as a product of the magnetic field and electric current.

The force generated in E-M pump 15 controls the pressure of the electrically conductive fluid at the output of the pump relative to the input pressure and can be varied by varying either one or both of the magnetic field and electric current parameters. Thus, the controllable force generated in pump 15 can be controlled in magnitude (by varying the magnitude of the magnetic field and, or, electric current) and direction (by changing the direction of the magnetic field or electric current) to thereby either increase or decrease the pressure $P_c$ of the control fluid at the output of pump 15 relative to the supply pressure $P_s$ at the input thereof. The control 18 for E-M pump 15 comprises a conventional electronic circuit for varying the electric current and magnetic field excitation in E-M pump 15.

FIG. 2 illustrates a push-pull embodiment of the circuit illustrated in FIG. 1 and thus is especially adapted to function as a diverting circuit wherein the electrically conductive fluid is proportioned to flow in a controlled desired manner to utilization devices in circuits A (20) and B(21). The desired diverting or proportioning of the fluid flow between circuits A and B is obtained by controlling the flow of electrically conductive fluid through two parallel connected vortex fluid amplifiers 10' and 10'' which supply circuits A and B, respectively. Electromagnetic pumps 15' and 15'' control the pressures $P_{c1}$ and $P_{c2}$ of the control fluid supplied to vortex amplifiers 10' and 10'', respectively. A conventional electronic control circuit 18' provides a push-pull control of the magnetic field and electric current excitation for two pumps 15' and 15'' to obtain the desired control pressure signals $P_{c1}$, $P_{c2}$ which proportion the flow to circuits 20 and 21. The outputs of circuits 20 and 21 are suitably vented (in the case of a gaseous medium) or connected to drain 22 (in the case of a liquid medium).

The details of the circuit of FIG. 2 and the operation thereof will now be described. The main fluid inlet passages 11' and 11'' of vortex amplifiers 10' and 10'', respectively, are supplied with pressurized electrically conductive fluid, the input ends of the main fluid inlets being connected to a juncture 23 connected to pressurized source $P_s$. A third passage 24 is connected from juncture 23 to a second juncture 25 which provides connection to passage 17' and 17'' connected to the inputs of E-M pumps 15' and 15'', respectively. The outputs of E-M pumps 15' and 15'' are connected to the input ends of the vortex fluid amplifier control fluid inlet passages 12' and 12'', respectively. The load circuits 20, 21 are connected to the output ports of vortex amplifier 10', 10'' by means of passages 14' and 14''.

For most applications, vortex fluid amplifiers 10' and 10'' are of identical structure and size, and the E-M pumps 15', 15'' and utilization devices in circuits 20, 21 are likewise identical. In the general case, there is equal flow through the two vortex fluid amplifiers in the condition of zero differential control of the two E-M pumps, (i.e., pump control circuit 18' provides equal energization of E-M pumps 15' and 15''). The control action for effecting a proportionally greater flow to circuit 20 (or 21) and smaller flow to circuit 21 (or 20) is achieved by adjustment of push-pull pump control circuit 18' which provides for reciprocal proportionate energization of pumps 15' and 15''. Thus, in the case of a desired increased fluid flow to load 20 and decreased flow to load 21, the particular adjustment of pump control circuit 18' results in an increased current flow and, or, increased magnetic field in E-M pump 15'' and a reciprocal effect in E-M pump 15'. The increased energization of E-M pump 15'' generates a greater force therein and increases the pressure $P_{c2}$ of the control fluid flowing in control inlet 12'' thereby restricting the output flow from vortex amplifier 10'' to a greater degree than in the case of zero differential control (equal flows at the outputs of vortex amplifiers 10' and 10''). In like manner, the reciprocally decreased energization of E-M pump 15' reduces the pressure $P_{c1}$ of the control fluid flowing in control inlet 12' whereby the fluid flow through vortex amplifier 10' is less restricted and the output flow is therefore proportionally greater. It is obvious that a desired proportionate decreased output flow from vortex amplifier 10' and increased flow from vortex amplifier 10'' is obtained in a similar manner by proportionately decreasing the energization of E-M pump 15'' and reciprocally increasing the energization of E-M pump 15' to obtain the proportionately lesser restriction of flow through vortex amplifier 10'' and greater restriction through vortex amplifier 10'. Thus, it can be seen that a reciprocal control action applied to the E-M pumps results in a reciprocal degree of restriction of the main fluid flow through the two vortex amplifiers to thereby obtain the desired proportionate flows to load circuits 20 and 21. The pump control circuit 18' may be operated such that at zero differential control, the control fluid pressures $P_{c1}$ and $P_{c2}$ are equal to the main fluid supply pressure $P_s$, or are both equal and slightly higher (or even lower) in pressure than $P_s$.

In each of the FIGS. 1 and 2 embodiments, the control fluid flow is approximately 10 to 20 percent of the maximum main fluid flow for accomplishing the maximum restriction of flow through the vortex fluid amplifier, and the pressure of the control fluid need only be about 10 percent greater than the supply pressure $P_s$ to obtain this maximum restrictive effect. The size of the E-M pump utilized in my invention is about one-tenth the size of an E-M pump used as a sole control element for obtaining the same flow control action. The electric power economy is also in about the same ratio.

From the foregoing description it can be appreciated that my invention meets the objectives set forth in that it provides a vortex fluid amplifier circuit and improved method for controlling the flow of an electrically conductive fluid. The use of a relatively small E-M pump in the control input circuit of the vortex amplifier obtains a flow control effect similar to that obtained with a much larger E-M pump used as the sole control element. It should be appreciated that the single-sided control of one, or push-pull control of two small E-M pumps in the control circuit(s) of the vortex fluid amplifier(s) is much simpler achieved than a corresponding control of much larger E-M pumps. The much lower current requirements in the smaller E-M pumps are a particular advantage since the necessary electrical conductors can be appreciably smaller in cross section.

What I claim as new and desire to secure by Letters Patent of the United States is:

1. A circuit for controlling the flow of an electrically conductive fluid comprising:

a. a first vortex type fluid amplifier having no moving mechanical parts and comprising a cylindrical chamber, a main fluid passage extending radially through a cylindrical side wall of said chamber for directing a pressurized electrically conductive main flow of fluid radially inward thereof, said main fluid passage connected to a source of the pressurized electrically conductive fluid, an output port remote from the chamber side wall for discharging the electrically conductive fluid from said chamber, and a control fluid passage extending tangentially through the side wall of said chamber for directing a pressurized electrically conductive control fluid flow tangentially inward to restrain the main flow of fluid through said chamber from the main fluid passage to the output port;

b. a second vortex type fluid amplifier having no moving mechanical parts and comprising a cylindrical chamber, a main fluid passage extending radially through a cylindrical side wall of said chamber for directing a pressurized electrically conductive main flow of fluid radially inward thereof, said main fluid passage connected to the source of the pressurized electrically conductive fluid, an output port remote from the chamber side wall for discharging the electrically conductive fluid from said chamber, and a control fluid passage extending tangentially through the side wall of said chamber for directing a pressurized electrically conductive control fluid flow tangentially inward to restrain the main flow of fluid through said chamber from the main fluid passage to the output port;

c. means for controlling the pressures of the electrically conductive control fluids in the two vortex fluid amplifiers in a reciprocal relationship to thereby obtain a desired proportioning of the flows of electrically conductive fluid discharged at the output ports thereof; and d. said reciprocal pressure controlling means comprising two electromagnetic pumps having inputs connected to the source of pressurized electrically conductive fluid and outputs connected to the control fluid passages of the two vortex fluid amplifiers.

2. The electrically conductive fluid flow control circuit set forth in claim 1 and further comprising means for controlling the excitation of the two electromagnetic pumps in a reciprocal relationship to thereby obtain the desired proportioning of the flows at the output ports.

3. A circuit for controlling the flow of an electrically conductive fluid comprising:

a. a first vortex type fluid amplifier having no moving mechanical parts and comprising a cylindrical chamber, a main fluid passage having an input end connected to a source of pressurized electrically conductive fluid and an output end extending radially through a cylindrical side wall of said chamber for directing a pressurized electrically conductive main flow of fluid radially inward thereof, an output port disposed centrally through at least one end wall of said chamber for discharging the electrically conductive fluid from said chamber, and a control fluid passage having an output end extending tangentially through the side wall of said chamber for directing a pressurized electrically conductive control fluid flow tangentially inward and developing an arcuate flow through said chamber to restrain the main flow of fluid through said chamber from the main fluid passage to the output port;

b. a second vortex fluid amplifier having no moving mechanical parts and comprising a cylindrical chamber, a main fluid passage having an input end connected to the source of pressurized electrically conductive fluid and an output end extending radially through a cylindrical side wall of said chamber for directing a pressurized electrically conductive main flow of fluid radially inward thereof, an output port disposed centrally through at least one end wall of said chamber for discharging the electrically conductive fluid from said chamber, and a control fluid passage having an output end extending tangentially through the side wall of said chamber for directing a pressurized flow of electrically conductive control fluid tangentially inward and developing an arcuate flow through said chamber to restrain the main flow of fluid through said chamber from the main fluid passage to the output port;

c. means having an input connected to the source of pressurized electrically conductive fluid, a first output connected to an input end of said control fluid passage of said first vortex fluid amplifier for controlling the pressure of the electrically conductive control fluid thereof and a second output connected to an input end of the control fluid passage associated with said second vortex fluid amplifier for controlling the pressure of the electrically conductive control fluid thereof, and thereby control the flows of the electrically conductive fluid discharged at the output ports of said first and second vortex fluid amplifiers; and d. said pressure controlling means comprising first and second electromagnetic pumps having inputs thereof connected to the source of pressurized electrically conductive fluid, and outputs thereof connected to the input ends of the control fluid passages associated with said first and second vortex fluid amplifiers, respectively.

4. The electrically conductive fluid flow control circuit set forth in claim 3 wherein said pressure controlling means further comprise
means for controlling the excitation of said first and second pumps in a reciprocal relationship to thereby obtain a desired proportioning of the flows at the output ports of said first and second vortex fluid amplifiers.

5. A method for controlling the flow of an electrically conductive fluid comprising the steps of:

a. supplying a pressurized electrically conductive main fluid flow radially inward of a first vortex fluid amplifier;

b. supplying a pressurized electrically conductive fluid flow to a first electromagnetic pump;

c. supplying a pressurized electrically conductive control fluid flow from said first electromagnetic pump tangentially inward of said first vortex fluid amplifier;

d. supplying a pressurized electrically conductive main fluid flow radially inward of a second vortex fluid amplifier;

e. supplying a pressurized electrically conductive fluid flow to a second electromagnetic pump;

f. supplying a pressurized electrically conductive control fluid flow from said second electromagnetic pump tangentially inward of said second vortex fluid amplifier; and g. controlling the excitation of said first and second electromagnetic pumps in a reciprocal relationship to obtain a desired proportioning of the pressurized electrically conductive control fluid flows from said first and second electromagnetic pumps to thereby provide a desired proportioning of the output flows from said first and second vortex fluid amplifiers.

* * * * *